(12) United States Patent
Atmaram et al.

(10) Patent No.: US 8,944,957 B2
(45) Date of Patent: Feb. 3, 2015

(54) CHANGE OF MIND SHIFT CONTROL

(75) Inventors: Harinath Atmaram, Novi, MI (US); William R. Mayhew, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 429 days.

(21) Appl. No.: 13/293,402

(22) Filed: Nov. 10, 2011

(65) Prior Publication Data

US 2013/0118850 A1    May 16, 2013

(51) Int. Cl.
| | |
|---|---|
| *F16H 61/04* | (2006.01) |
| *B60W 10/06* | (2006.01) |
| *F16H 59/14* | (2006.01) |
| *F16H 61/02* | (2006.01) |
| *F16H 61/68* | (2006.01) |
| *F16H 61/06* | (2006.01) |

(52) U.S. Cl.
CPC ............... *F16H 59/14* (2013.01); *F16H 61/02* (2013.01); *F16H 61/68* (2013.01); *F16H 61/06* (2013.01); *F16H 61/0437* (2013.01); *F16H 2306/24* (2013.01)
USPC .............................. 477/115; 477/70; 477/120

(58) Field of Classification Search
CPC ..... B60W 10/06; B60W 10/08; B60W 10/10; F16H 2061/062; F16H 2061/0444; F16H 2061/0448
USPC .................................................. 477/115, 120
See application file for complete search history.

(56) References Cited

U.S. PATENT DOCUMENTS

| | | | | |
|---|---|---|---|---|
| 8,308,611 B2* | 11/2012 | Rangaraju et al. | ............ | 477/135 |
| 2011/0183809 A1* | 7/2011 | Rangaraju et al. | ............ | 477/120 |

* cited by examiner

*Primary Examiner* — Edwin A Young
*Assistant Examiner* — Colby M Hansen
(74) *Attorney, Agent, or Firm* — Quinn Law Group, PLLC

(57) ABSTRACT

A method of controlling shifts in a multi-speed transmission includes beginning an initial shift, which changes the transmission from a starting gear to an initial target gear, and executing an adjusted shift, which changes the transmission to an adjusted target gear having higher speed ratio than the initial target gear, when transition conditions are satisfied. The transition conditions include a threshold increase in torque request, which is sufficient to require the transmission to be placed into the adjusted target gear. The transition conditions also include a common controlling clutch, which is an off-going clutch to place the transmission in the adjusted target gear. Executing the adjusted shift does not include placing the transmission in a neutral mode. Furthermore, executing the adjusted shift does not include completing the initial shift.

8 Claims, 7 Drawing Sheets

CHANGE OF MIND SHIFT CONTROL

TECHNICAL FIELD

This disclosure relates to controls for, and methods of operating, transmissions having a plurality of clutches.

BACKGROUND

An automatic transmission may include a plurality of torque-transmitting mechanisms, such as clutches and brakes. Some of the torque-transmitting mechanisms may be selectively engageable to choose the speed ratio or operating mode of the transmission. The transmission may shift between different speed ratios based upon operating conditions of the powertrain into which the transmission is incorporated.

SUMMARY

A method of controlling shifts in a multi-speed transmission is provided. The method includes beginning an initial shift, which changes the transmission from a starting gear to an initial target gear. If transition conditions are satisfied, the method will change to executing an adjusted shift. The adjusted shift changes the transmission to an adjusted target gear, which has a higher speed ratio than the initial target gear.

The transition conditions include a threshold increase and a common controlling clutch. The threshold increase moves from a first torque request during the beginning of the initial shift to a second torque request after beginning the initial shift, and is sufficient to require the transmission to be placed into the adjusted target gear. The common controlling clutch is an off-going clutch to place the transmission in the adjusted target gear.

Executing the adjusted shift does not include placing the transmission in a neutral mode. Furthermore, executing the adjusted shift does not include completing the initial shift, such that the transmission is never actually placed into the initial target gear.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
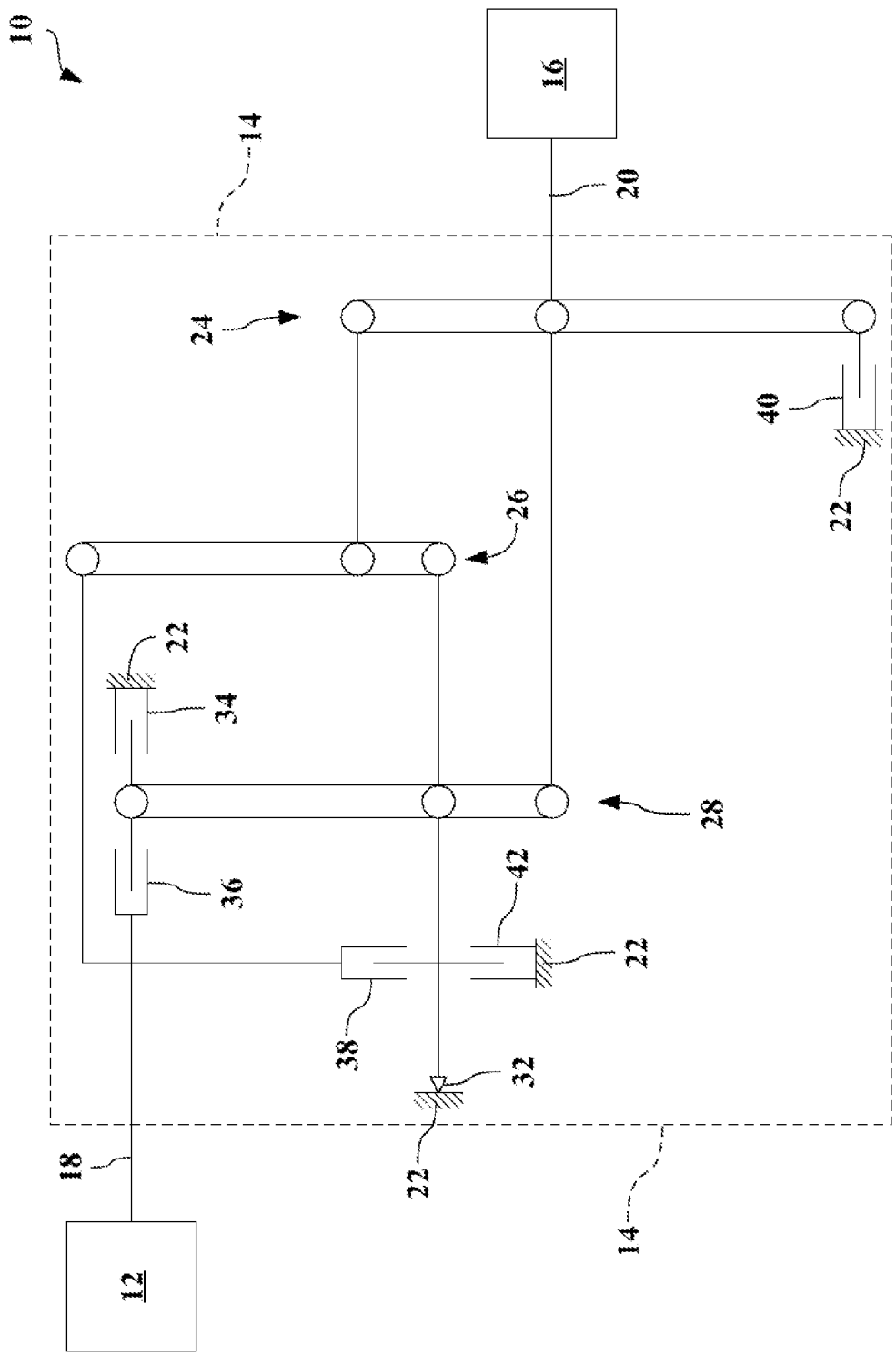
FIG. 1 is a schematic, diagrammatic view of a powertrain having an automatic transmission, which is shown as a lever diagram.

Referring to the drawings, wherein like reference numbers correspond to like or similar components whenever possible throughout the several figures, there is shown in FIG. 1 an illustrative powertrain system, designated generally as powertrain 10, for numerous types of vehicles (not shown). The powertrain 10 includes an internal combustion engine 12 drivingly connected to a transmission 14. The transmission 14 is a multi-speed, fixed-gear transmission, and is in power-flow communication with a final drive system 16. The transmission 14 may be referred to as an automatic transmission, as contrasted with a manual transmission having a foot-operated clutch. Components shown and described in relation to one of the figures may be applied to, or combined with, components shown and described in any of the other figures.

In FIG. 1, the transmission 14 is shown as a lever diagram. A lever diagram is a schematic representation of the components of a mechanical device, such as an automatic transmission. Each individual lever represents a planetary gear set, wherein the three basic mechanical components of the planetary gear are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gear set. These lever ratios, in turn, are used to vary the speed ratio of the transmission in order to achieve appropriate ratios and ratio progression.

In the lever diagram, mechanical couplings or interconnections between the nodes of the various planetary gear sets and other components of the transmission are illustrated by thin lines. Torque-transmitting mechanisms or torque-transfer devices, such as clutches and brakes, may be presented as interleaved fingers. If the mechanism is a brake, one set of the fingers is grounded.

The final drive system 16 may include a front or rear differential, or other torque-transmitting mechanism, which provides torque output to one or more wheels (note shown) through respective vehicular axles or half-shafts (not shown). The wheels may be either front or rear wheels of the vehicle on which they are employed, or they may be a drive gear of a track vehicle. Those having ordinary skill in the art will recognize that the final drive system 16 may include any known configuration, including front-wheel drive (FWD), rear-wheel drive (RWD), four-wheel drive (4WD), or all-wheel drive (AWD), without altering the scope of the claimed invention.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The transmission 14 is designed to receive at least a portion of its driving power from the engine 12 via an input member 18. The transmission input member 18 may be the engine output shaft (also referred to as a crankshaft). The powertrain 10 may include another primary mover, such as an electric machine (not shown), operatively attached to the input member 18. The electric machine may add or remove power or torque from the input member 18. The powertrain 10 may also include a torque converter (not shown) disposed between the engine 12 and the transmission 14.

The input member 18 transfers power to the transmission 14, which distributes power and torque through an output shaft 20 to the final drive system 16 to propel the vehicle (not shown). A battery (not shown) acts as an energy storage device for the powertrain 10 and the vehicle and may be a chemical battery, battery pack, or another energy storage device recognizable to those having ordinary skill in the art. The transmission 14 includes a transmission case or housing 22, some or all of which may be incorporated into other components of the powertrain 10.

The transmission 14 shown in FIG. 1 is a six-speed automatic transmission, i.e., there are six forward speed ratios of operation between the input member 18 and the output member 20. However, the methods, processes, and techniques described herein may be applied to transmissions with fewer speed ratios (such as four or five speeds) or with additional speed ratios (such as eight speeds).

As used herein, speed ratio may be used interchangeably with torque ratio, torque multiplication, or gear ratio. Specific speed ratios of the transmission 14 may be referred to as specific modes or specific gears, such as Gear 1, Gear 2, etc.; or may be referred to as named gears, such as starting gear, initial target gear, adjusted target gear, etc. These gears refer to modes of operation in which specific speed ratios are active for the transmission 14, usually through selective actuation of torque-transmitting mechanisms, as explained herein.

The powertrain 10 and the transmission 14 may be in communication with a controller or control system. Execution of shifts between different speed ratios of the transmission 14 may occur in response to commands from the control system or may be in control of the transmission itself 14.

The transmission 14 utilizes one or more differential gear arrangements, such as epicyclic planetary gear sets: a first planetary gear set 24 (P1), a second planetary gear set 26 (P2), and a third planetary gear set 28 (P3). The first planetary gear set 24, second planetary gear set 26, and third planetary gear set 28 each include first, second and third gear members (not separately numbered).

In referring to the first, second and third planetary gear sets 24, 26, 28 these sets may be denoted "first" to "third" in any order in the drawings (e.g., left to right, right to left, or varied). Similarly, the first, second and third gear members of first planetary gear set 24, second planetary gear set 26, third planetary gear set 28 may be identified as "first" to "third" in any order in the drawings (e.g., top to bottom, bottom to top, or varied).

The transmission 14 includes six torque-transmitting mechanisms. In the illustrative embodiment depicted in FIG. 1, the torque-transmitting mechanisms are friction clutches and one-way clutches. However, other clutch configurations may be employed, such as dog clutches, rocker clutches, and others recognizable to those having ordinary skill in the art. Some or all of the clutches may be hydraulically actuated, receiving pressurized hydraulic fluid from a pump (not shown). Torque-transmitting mechanisms acting as brakes may be selectively connected to a static element of the powertrain 10, such as the housing 22 of the transmission 14.

The rotating components of transmission 14 may be coaxially oriented about a central axis, which may be coaxial with the input member 18, the output member 20, or both. Various shafts, sleeve shafts, belts, gears, or similar connecting members may connect the components of the transmission 14. For illustrative purposes, the torque-transmitting mechanisms may be named according to the gears or modes for which each is engaged, as showed herein.

A first torque-transmitting mechanism 32 —which may be interchangeably referred to as clutch F1—is a one-way clutch that allows a first member of the third planetary gear set 28 to rotate in only a single direction. A second torque-transmitting mechanism 34 —which may be interchangeably referred to as clutch CB26 —is a brake clutch that selectively grounds a second member of the third planetary gear set 28 to the housing 22.

A third torque-transmitting mechanism 36—which may be interchangeably referred to as clutch C35R—selectively connects the input member 18 to the second member of the third planetary gear set 28. A fourth torque-transmitting mechanism 38—which may be interchangeably referred to as clutch C456—selectively connects the input member 18 to the first member of the third planetary gear set 28.

A fifth torque-transmitting mechanism 40 —which may interchangeably referred to as clutch Cl234 —is a brake clutch that selectively grounds a first member of the first planetary gear set 24 to the housing 22. A sixth torque-transmitting mechanism 42 —which may interchangeably referred to as clutch CBR —is a brake clutch that selectively grounds the first member of the third planetary gear set 28 to the housing 22.

The exact connections between elements of the transmission 14 shown in FIG. 1 are not limiting. The methods, processes, and techniques described herein may be applied to transmissions with different configurations.

Table 1 shows a schematic chart of the clutch states for placing the automatic transmission 14 of the powertrain 10 shown in FIG. 1 into a plurality of forward speed ratios (which may be referred to as first through sixth gears; or as Gear 1, Gear 2, Gear 3, etc.). Referring to Table 1, selective engagement of the first, second, third, fourth, or fifth torque-transmitting mechanisms 32, 34, 36, 38, 40 is represented by an "X" in the chart. In the case of the first torque-transmitting mechanism 32, engagement refers to rotation against the one-way clutch —such that the first torque-transmitting mechanism 32 is effectively locked or engaged and is acting as a brake —as a result of selection of the remaining torque-transmitting members. Non-engagement is represented by a blank space. The sixth torque-transmitting mechanism 42 (CBR) is not shown in Table 1 because that clutch may not be involved in normal forward operation. Table 1:

TABLE 1

| | Clutch: | | | | |
| --- | --- | --- | --- | --- | --- |
| | F1 | CB26 | C35R | C456 | CB1234 |
| | | | Element: | | |
| Gear | 32 | 34 | 36 | 38 | 40 |
| 1 | X | | | | X |
| 2 | | X | | | X |
| 3 | | | X | | X |
| 4 | | | | X | X |
| 5 | | | X | X | |
| 6 | | X | | X | |

From Table 1, the clutch transitions for any shifts between forward speed ratios may be determined. Shifting from one forward speed ratio to another is achieved by disengaging one or more engaged clutches, referred to as off-going clutches, while engaging one or more disengaged clutches, referred to as on-coming clutches. Clutches which remain engaged throughout the shift are referred to as holding clutches.

For example, to downshift from Gear 6 to Gear 2, the off-going clutch is the fourth torque-transmitting mechanism 38 (C456) and the on-coming clutch is the fifth torque-transmitting mechanism 40 (C1234). For such a downshift, the off-going clutch controls the speed ratio transition. Similarly, to upshift from Gear 4 to Gear 5, the off-going clutch is the fifth torque-transmitting mechanism 40 (C1234) and the on-coming clutch is the third torque-transmitting mechanism 36 (C35R). For such an upshift, the on-coming clutch controls the speed ratio transition.

Figure 2:
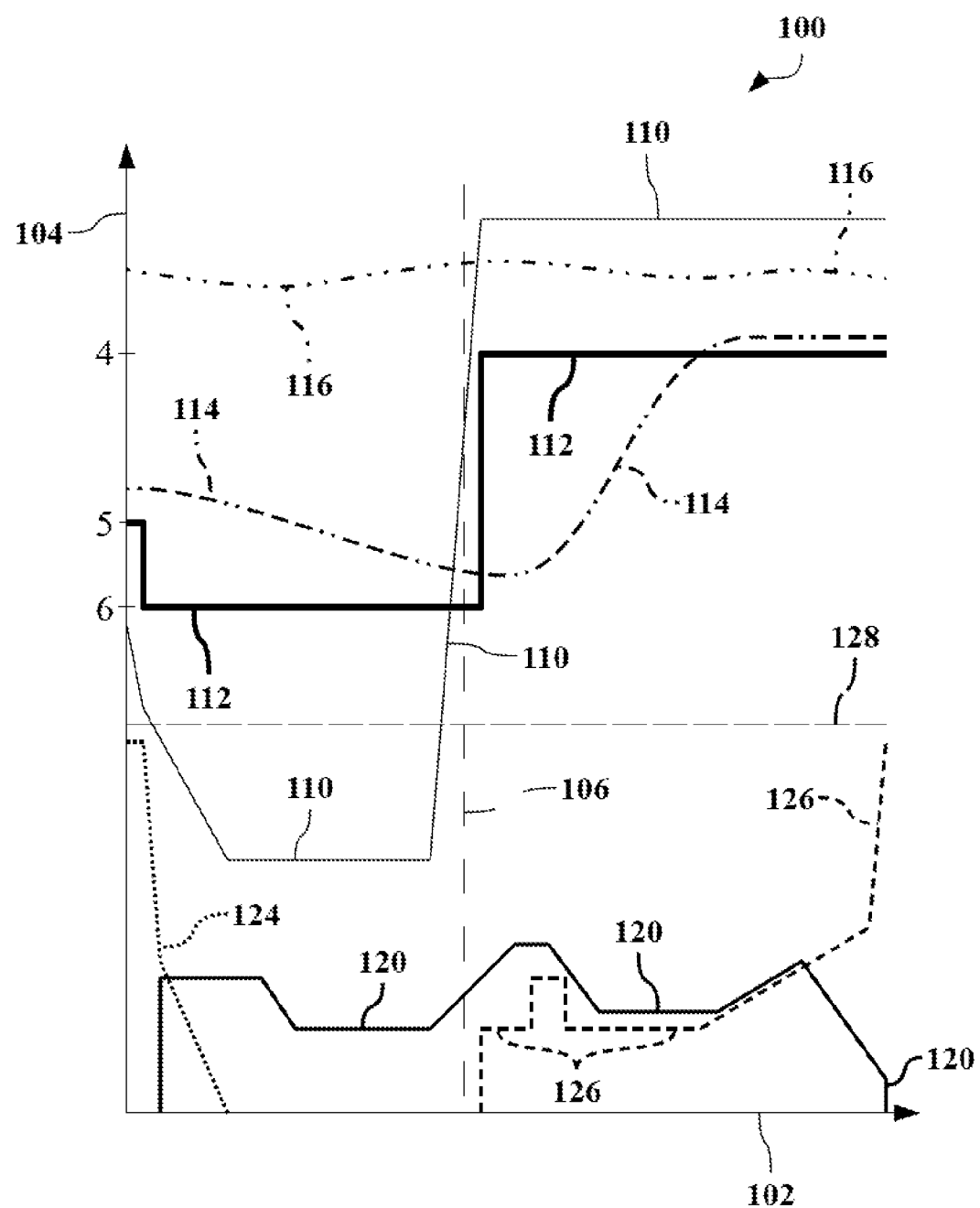
FIG. 2 is a schematic chart of a shift maneuver for automatic transmissions, such as those shown and described in FIG. 1.

Referring now to FIG. 2, and with continued reference to FIG. 1, there is a schematic chart 100 of an illustrative shift maneuver for the transmission 14 or similar transmissions. The chart 100 shows the transmission 14 during a maneuver from an initial shift, which is an upshift (US), to an adjusted shift, which is a power-on downshift (PD). The chart 100 and the shift maneuver illustrated herein are described with the components of the powertrain 10 and the transmission 14, but other powertrain and transmission configurations may be used to execute the shift maneuver and may have similar illustrative charts.

Generally, power-on shifts occur when an accelerator pedal (not shown) is depressed and the driver is requesting torque, or when the throttle is being actuated by the control system to request torque. Power-off shifts occur during times of lesser torque requests. Power-on shifts often occur during times of acceleration and may require more-precise control over the elements of the transmission 14 in order to provide more-pleasing driving feel.

During the maneuver, the initial shift is intended to change the transmission 14 from a starting gear, which is Gear 5, to an initial target gear, which is Gear 6. However, before completing that upshift, the maneuver then seamlessly changes to a downshift to an adjusted target gear, Gear 4. Therefore, the chart 100 illustrates control of the transmission 14 through what may be referred to as a 5-6-4 shift maneuver.

The chart 100 includes an x-axis 102, which illustrates time from left to right, and a y-axis 104, which represents different values depending upon the individual characteristics being shown. The y-axis 104 may represent speed ratio, fluid pressure, torque, rotational speed, or acceleration. A time marker 106 is used to help identify general locations or times of events occurring during the maneuver.

A torque request 110 illustrates the relative amount of torque being requested of the transmission 14. The torque request 110 may be derived from the throttle, which may be controlled by the accelerator pedal input by the driver or may be derived from other systems, including (but not limited to) cruise control and traction control systems. Relative to the y-axis 104, the toque request 110 moves upward with increasing torque. The scale of the torque request 110 may vary greatly depending upon the type of vehicle (such as small cars versus semi-tractors).

A commanded gear 112 shows the gear sought by the transmission 14. The commanded gear 112 shows the mode (i.e., specific speed ratio) in which the transmission 14 is commanding operation. For example, when the driver requests significantly more acceleration by depressing the accelerator pedal, it may be an indication that the transmission 14 should downshift into a lower gear to better accelerate the vehicle. The transmission 14 may then change the commanded gear 112 from Gear 6 (a high gear) to Gear 4 (a lower gear having a higher speed ratio). Relative to the y-axis 104, the speed ratio of the transmission 14 increases in the upward direction; therefore, the gear number decreases in the upward direction. In the 5-6-4 shift maneuver of chart 100, Gear 4 is higher than Gear 6 because the speed ratio and torque multiplication of Gear 4 are higher than that of Gear 6.

The commanded gear 112 may be determined by the control system from analysis of the operating conditions of the powertrain 10 in light of the torque request 110. For example, an increasing torque request 110 suggests that the transmission 14 should operate with higher speed ratio and that a downshift (such as from Gear 6 to Gear 4) is beneficial. In the 5-6-4 shift maneuver of chart 100, the transmission 14 begins with operation in Gear 5, but immediately switches to commanding operation in Gear 6. However, because the torque request 110 increases before Gear 6 is reached, the transmission 14 commands operation in Gear 4, as shown by the commanded gear 112.

The chart 100 also includes an input speed 114, which illustrates the relative rotational speed (Ni) of the input member 18 for the transmission 14. Depending upon the configuration of the powertrain 10, the input speed 114 may be equivalent to the speed of the engine 12, to the speed of a turbine of the torque converter, or to other input devices to the transmission 14. The chart 100 further illustrates relative output acceleration 116 of the transmission 14 to the final drive 16. Both the input speed 114 and the output acceleration 116 are positive in the upward direction of the y-axis 104.

The chart 100 shows the relative pressures of the clutches used to place the transmission 14 into the respective speed ratios. A controlling clutch pressure 120 shows the element that controls the shift. In the 5-6-4 shift maneuver shown, the controlling clutch is the second torque-transmitting mechanism 34 (CB26). The second torque-transmitting mechanism 34 is the on-coming clutch to change the transmission 14 from Gear 5 to Gear 6, the initial target gear, and is also the off-going clutch to place the transmission 14 into Gear 4, the adjusted target gear. Therefore, the second torque-transmitting mechanism 34 is a common controlling clutch for the shift maneuver.

The chart 100 shows a first off-going clutch pressure 124 and a second on-coming clutch pressure 126. The first off-going clutch pressure 124 shows the fluid pressure of the third torque-transmitting mechanism 36 (C35R). The second on-coming clutch pressure 126 shows the fluid pressure of the fifth torque-transmitting mechanism 40 (C1234).

As shown on the chart 100, around the time marker 106, the torque request 110 increases substantially. At the beginning of the 5-6-4 shift maneuver, the torque request 110 is decreasing and, consequently, the commanded gear 112 moves from Gear 5 to Gear 6. This may be referred to as a coast upshift, as opposed to a power-off shift, because some amount of torque is still being requested of the transmission 14. Alternatively, the shift from Gear 5 to Gear 6 may be a power-on upshift or a partial power-on upshift. At the beginning of the maneuver shown, the controller or the transmission 14 has determined that Gear 6 provides better fuel efficiency for these operating conditions of the powertrain 10.

In order to execute the initial upshift from Gear 5 to Gear 6, the transmission 14 begins pressurizing the controlling clutch, the second torque-transmitting mechanism 34, as shown by the controlling clutch pressure 120. The transmission 14 also off-loads the third torque-transmitting mechanism 36, as shown by the first off-going clutch pressure 124, which is exhausted or emptied shortly after beginning the initial shift. Sometime after the time marker 106, the second torque-transmitting mechanism 34 would have been engaged by increasing the controlling clutch pressure 120. If the controlling clutch (the second torque-transmitting mechanism 34) had fully engaged, the initial upshift from Gear 5 to Gear 6 would have completed.

However, after time marker 106, the transmission 14 determines that the increased torque request 110 is better satisfied by shifting the transmission to Gear 4, as shown by the upward increase in the commanded gear 112. Because the initial shift from Gear 5 to Gear 6 has not yet completed, the transmission 14 cannot simply execute a second shift from Gear 6 to Gear 4 to satisfy the commanded gear 112.

After the increased torque request 110, the transmission changes from executing the initial shift (Gear 5 to Gear 6) to executing the adjusted shift (to Gear 4). The increase may be referred to as a threshold increase, because that increase was sufficient to require the transmission 14 to be placed into the adjusted target gear (Gear 4), which has a higher speed ratio than the initial target gear (Gear 6).

For the transmission 14, the change to the adjusted shift is possible because the second torque-transmitting mechanism 34 is the common controlling clutch between the initial target gear (Gear 6) and the adjusted target gear (Gear 4). Alternatively, the transmission 14 could have finished the initial shift and then executed an additional shift from Gear 6 to Gear 4.

As another alternative to the methods described herein, the transmission 14 could have aborted the initial shift by opening all of the clutches and moving into a neutral mode. A skip-via-neutral shift occurs when a transmission "skips" from one speed ratio to another speed ratio via a neutral state. In a skip-via-neutral shift, the first shift is aborted, any holding clutches are released, the transmission is placed in the neutral state, and the clutches for the desired speed ratio of the second shift are applied. However, executing a skip-via-neutral shift when acceleration is requested may degrade shift feel. For example, a torque hole may result, causing the driver to perceive that the vehicle is slowing down even though acceleration is requested. A torque hole may cause head bobble and a counterintuitive feel.

After commanding the adjusted shift to the adjusted target gear, instead of completing engagement of the second torque-transmitting mechanism 34, the transmission begins to fill the second on-coming clutch—the fifth torque-transmitting mechanism 40—as shown by the second on-coming clutch pressure 126. The adjusted shift finishes when the common controlling clutch—the second torque-transmitting mechanism 34—exhausts and the fifth torque-transmitting mechanism 40 completes its fill.

The chart 100 also shows a common holding clutch pressure 128, which is engaged throughout the change-of-mind 5-6-4 shift maneuver. The common holding clutch pressure 128 is illustrative of the relative fluid pressure of the fourth torque-transmitting mechanism 38 (C456).

Therefore, the 5-6-4 shift maneuver completes with the transmission 14 in Gear 4 without passing through neutral and without completing the initial shift to Gear 6. As shown in the chart 100, the output acceleration 116 remains smooth throughout the 5-6-4 shift maneuver. If the output acceleration 116 varies sharply, the vehicle may abruptly change speed and cause the driver to feel a lag, jolt, or other possibly undesirable driving conditions.

Figure 3:
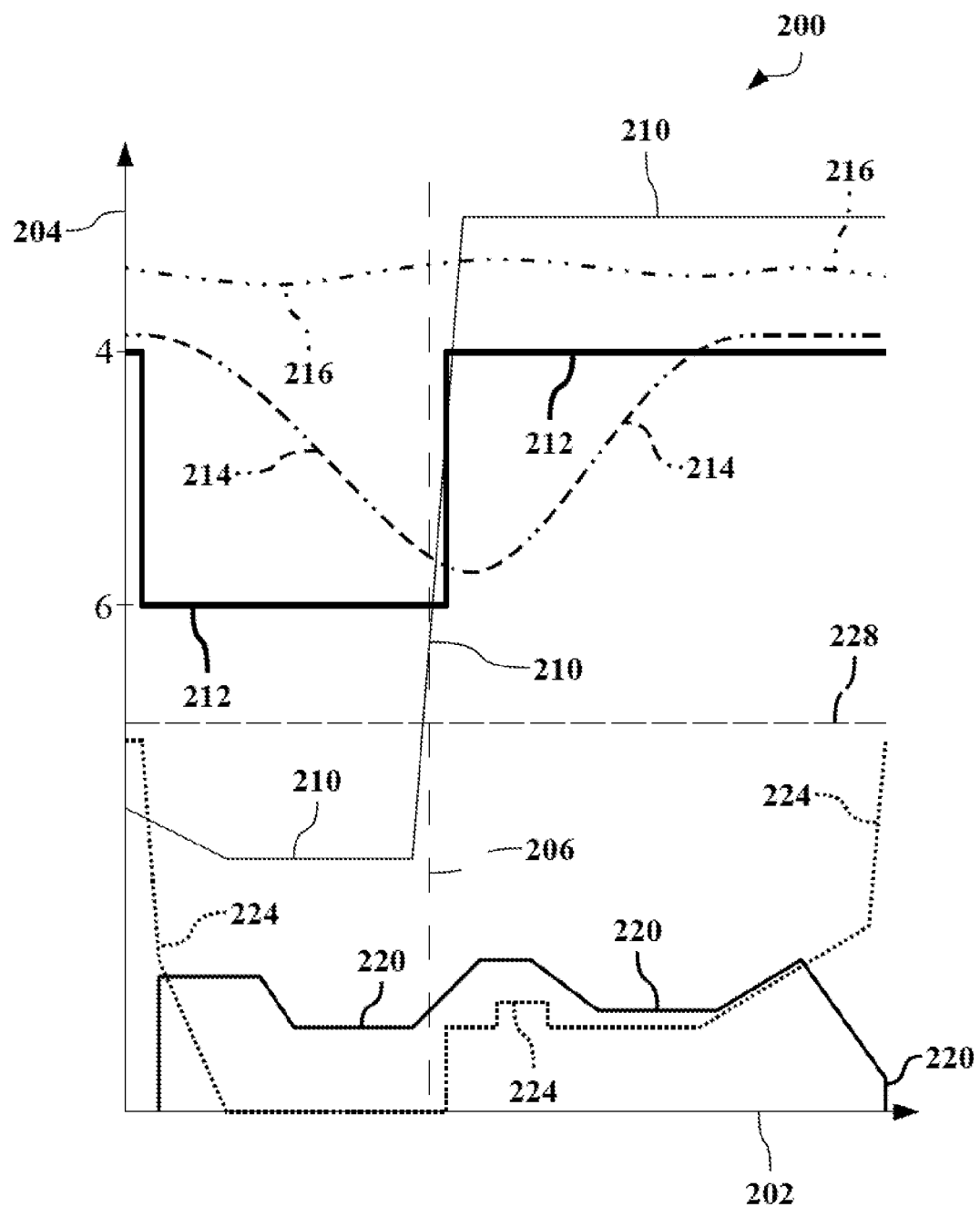
FIG. 3 is a schematic chart of another shift maneuver for automatic transmissions, such as those shown and described in FIG. 1.

Referring now to FIG. 3, and with continued reference to FIGS. 1-2, there is a schematic chart 200 of another illustrative shift maneuver for the transmission 14 or similar transmissions. The chart 200 shows the transmission 14 during a similar shift maneuver to that shown in FIG. 2 but demonstrates that the exact same speed ratios need not be involved to execute the shift maneuvers. However, FIG. 3 shows a 4-6-4 maneuver, taking the transmission from an initial shift between Gear 4 and Gear 6, and then through an adjusted shift that returns the transmission 14 to Gear 4.

The chart 200 includes an x-axis 202, which illustrates time from left to right, and a y-axis 204, which represents different values depending upon the individual characteristics being shown. A time marker 206 is used to help identify general locations of events occurring during the maneuver.

A torque request 210 illustrates the relative amount of torque being requested of the transmission 14. The torque request 210 also shows a threshold increase around the time marker 206.

A commanded gear 212 shows the gear sought by the transmission 14, which may be determined by the control system from analysis of the operating conditions of the powertrain 10 in light of the torque request 210. In some configurations of the transmission 14, there may be a requested gear (not shown), which represents more-direct derivations of the driver's request, in addition to the commanded gear 212, which may be filtered through the abilities of the transmission 14 to actually reach the driver's requested gear. As shown in chart 200, the commanded gear 212 for the 4-6-4 shift maneuver moves from Gear 4 to Gear 6 at the beginning of the initial shift and then back to Gear 4 after the threshold increase around time marker 206.

The chart 200 also includes an input speed 214, which illustrates the relative rotational speed (Ni) of the input member 18 for the transmission 14. The chart 200 further illustrates relative output acceleration 216 of the transmission 14 to the final drive 16.

The chart 200 shows the relative pressures of the clutches used to place the transmission 14 into the respective speed ratios. A controlling clutch pressure 220 shows the element that controls the shift. In the 4-6-4 shift maneuver shown, the controlling clutch is the second torque-transmitting mechanism 34 (CB26). The second torque-transmitting mechanism 34 is the first on-coming clutch to change the transmission 14 from Gear 4 to Gear 6, the initial target gear, and is also the off-going clutch to place the transmission 14 back into Gear 4, the adjusted target gear. Therefore, the second torque-transmitting mechanism 34 is a common controlling clutch. The common controlling clutch is also the off-going clutch for taking the transmission 14 from Gear 6 to the ultimate (finishing) gear, Gear 4.

The chart 200 shows a first off-going clutch pressure 224. In the 4-6-4 shift maneuver, the first off-going clutch pressure 224 shows the fluid pressure of the fifth torque-transmitting mechanism 40 (C1234), which will also be the second on-coming clutch.

The first off-going clutch pressure 224 is exhausted at the beginning of the initial shift as the controlling clutch pressure 220 increases and takes control of the initial shift. After exhausting the fifth torque-transmitting mechanism 40, the second torque-transmitting mechanism 34 has control over the speed ratio of the transmission 14 throughout the shifts. If the transmission 14 were to finish the initial shift, the controlling clutch pressure 220 would be further increased to engage the second torque-transmitting mechanism 34 and place the transmission into Gear 6.

However, after time marker 206, the transmission 14 determines that the increased torque request 210 is better satisfied by shifting the transmission back to Gear 4 instead of Gear 6, as shown by the upward increase in the commanded gear 212. This may be referred to as a change-of-mind shift, because it appears that the driver has changed from a significantly decreasing torque request to an increasing torque request. Because the initial shift from Gear 4 to Gear 6 has not yet completed, the transmission 14 cannot simply execute a second, consecutive shift from Gear 6 to Gear 4 to satisfy the newly-increased commanded gear 212.

After the increased torque request 210, the transmission changes from executing the initial shift (Gear 4 to Gear 6) to executing the adjusted shift (to Gear 4). The increase may again be referred to as a threshold increase, because that increase was sufficient to require the transmission 14 to be placed into the adjusted target gear (Gear 4), which has a higher speed ratio than the initial target gear (Gear 6). Without the threshold increase, the transmission may be able to meet the torque needs of the powertrain 10 by simply increasing torque from the engine 12 while in Gear 6.

For the transmission 14, the change to the adjusted shift is possible because the second torque-transmitting mechanism 34 is the common controlling clutch between the initial target gear (Gear 6) and the adjusted target gear (Gear 4). The second torque-transmitting mechanism 34 was the on-coming clutch for the upshift from Gear 4 to Gear 6, and is the off-going clutch for the downshift from Gear 6 to Gear 4. Alternatively, the transmission 14 could have finished the initial shift and then executed a second shift from Gear 6 to Gear 4, but that would require time to finish the initial shift and may require time to reset or synchronize the transmission 14.

The initial shift could also have been aborted by opening all of the clutches and moving into a neutral mode, but neutral modes stop delivery of output torque and would decrease output acceleration. Executing the adjusted shift may significantly decrease the total time between the driver's increased torque request 210 and the ability of the transmission 14 to change to Gear 4 and supply the requested amount of torque.

After commanding the adjusted shift to the adjusted target gear, instead of completing engagement of the second torque-transmitting mechanism 34, the transmission begins to fill the on-coming clutch for Gear 4, which is the same as the off-going clutch exhausted at the beginning of the initial shift—the fifth torque-transmitting mechanism 40. The adjusted shift finishes when the common controlling clutch—the second torque-transmitting mechanism 34—exhausts and the fifth torque-transmitting mechanism 40 completes its fill.

The chart 200 also shows a common holding clutch pressure 228, which is engaged throughout the change-of-mind 4-6-4 shift maneuver. The common holding clutch pressure 228 is again illustrative of the relative fluid pressure of the fourth torque-transmitting mechanism 38 (C456). Having a common holding clutch may also be one of the transition conditions necessary for the transmission 14 to execute the adjusted shift.

Therefore, the 4-6-4 shift maneuver completes with the transmission 14 in Gear 4 without passing through neutral and without completing the initial shift to Gear 6. As shown in the chart 200, the output acceleration 216 remains smooth throughout the 4-6-4 shift maneuver.

Figure 4:
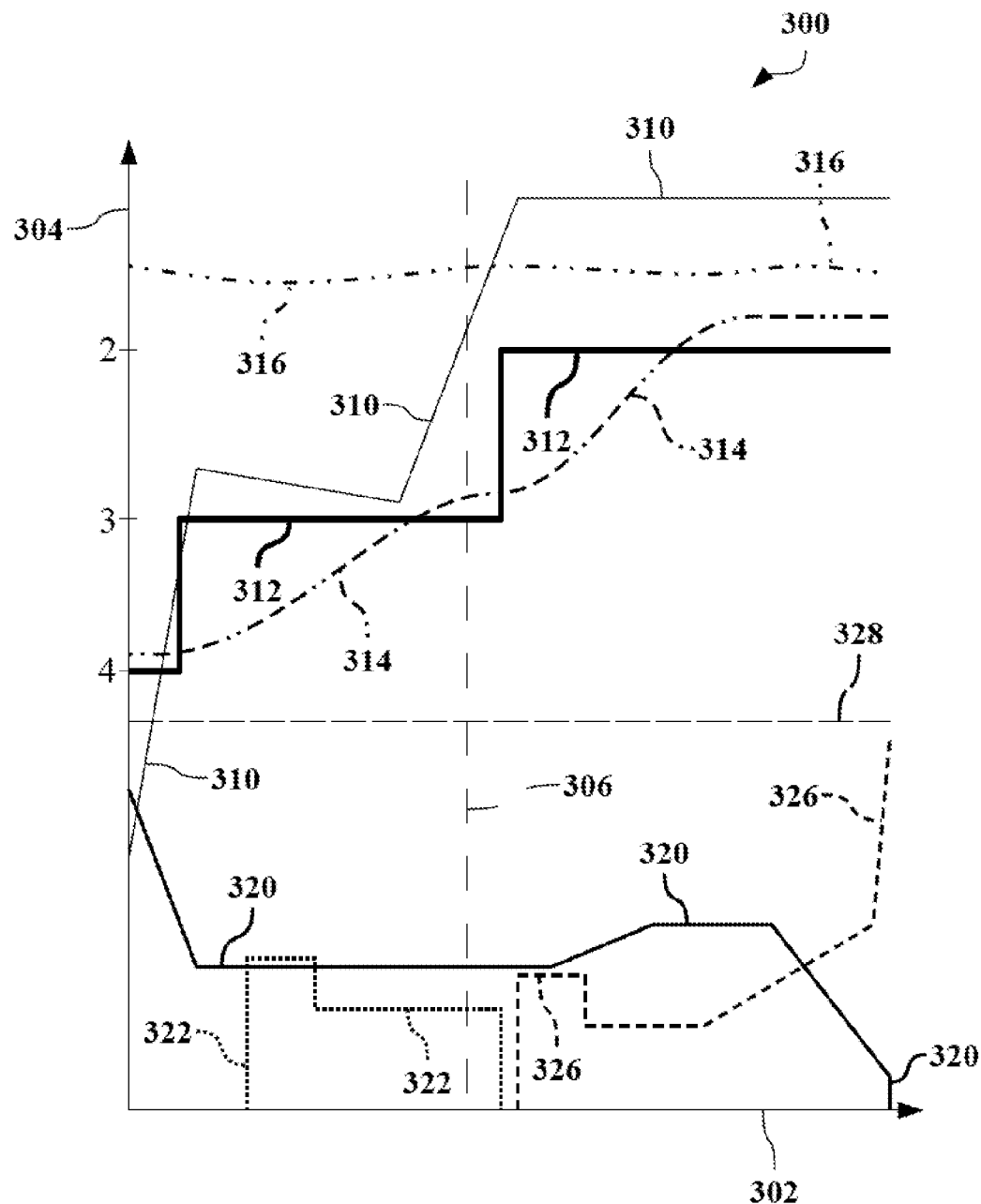
FIG. 4 is a schematic chart of another shift maneuver for automatic transmissions, such as those shown and described in FIG. 1.

Referring now to FIG. 4, and with continued reference to FIGS. 1-3, there is a schematic chart 300 of another illustrative shift maneuver for the transmission 14 or similar transmissions. Unlike the chart 100 and chart 200, which show the transmission 14 during shift maneuvers seamlessly changing from upshifts to power-on downshifts, the chart 300 shows the transmission 14 during a shift maneuver that demonstrates a power-on downshift seamlessly changing to another power-on downshift.

FIG. 4 shows a 4-3-2 maneuver, in which the transmission 14 moves from an initial shift between Gear 4 and Gear 3 to an adjusted shift that takes the transmission 14 to Gear 2. The initial shift occurs, for example, as a result of the driver stepping in on the throttle. The change to the adjusted shift occurs, for example, as the driver later begins to request additional acceleration (i.e., much higher torque) after the initial shift has already begun.

The chart 300 includes an x-axis 302, which illustrates time from left to right, and a y-axis 304, which represents different values depending upon the individual characteristics being shown. A time marker 306 is used to help identify general locations of events occurring during the shift maneuver.

A torque request 310 illustrates the relative amount of torque being requested of the transmission 14. Again the torque request 310 may be derived from many inputs or control systems. The torque request 310 also shows a threshold increase around the time marker 306.

A commanded gear 312 shows the gear sought by the transmission 14, which may be determined by the transmission 14 or the control system from analysis of the operating conditions of the powertrain 10 in light of the torque request 310. As shown in chart 300, the commanded gear 312 for the 4-3-2 shift maneuver moves from Gear 4 to Gear 3 at the beginning of the initial shift and then changes to execute a downshift from Gear 4 to Gear 2 after the threshold increase around time marker 306.

The chart 300 includes an input speed 314, which illustrates the relative rotational speed (Ni) of the input member 18 for the transmission 14. The chart 300 further illustrates an output acceleration 316 of the transmission 14 to the final drive 16.

The relative pressures of the clutches used to place the transmission 14 into the respective speed ratios are also shown in the chart 300. A controlling clutch pressure 320 shows the element that controls the shift by controlling the speed ratio of the transmission during the shift maneuver.

In the 4-3-2 shift maneuver shown, the controlling clutch is the fourth torque-transmitting mechanism 38 (C456). The fourth torque-transmitting mechanism 38 is the off-going clutch to change the transmission 14 from Gear 4 to Gear 3, the initial target gear. Additionally, the fourth torque-transmitting mechanism 38 is the off-going clutch to change the transmission 14 from Gear 4 to Gear 2, the adjusted target gear. Therefore, the fourth torque-transmitting mechanism 38 is a common controlling clutch to both shifts. Similar to the upshifts to power-on downshifts shown in FIGS. 3 and 4, the common controlling clutch is the off-going clutch for the ultimate (finishing) gear for the shift maneuver.

The chart 300 shows a first on-coming clutch pressure 322. In the 4-3-2 shift maneuver, the first on-coming clutch pressure 322 shows the fluid pressure of the third torque-transmitting mechanism 36 (C35R). During the initial shift, the first on-coming clutch pressure 322 is staged and the third torque-transmitting mechanism 36 pre-filled to prepare for the expected shift into Gear 3. Note that as the initial shift begins, the controlling clutch pressure 320 decreases but retains control of the initial shift. If the transmission 14 were to finish the initial shift, the controlling clutch pressure 320 would simply be exhausted and the first on-coming clutch pressure 322 raised to engage the third torque-transmitting mechanism 36.

However, around time marker 306, the transmission 14 determines that the increased torque request 310 is better satisfied by further increasing the speed ratio and shifting the transmission to Gear 2 instead of Gear 3, as shown by the upward increase in the commanded gear 312. Because the initial shift from Gear 4 to Gear 3 has not yet completed, the transmission 14 cannot simply execute a second, consecutive shift from Gear 3 to Gear 2 to satisfy the newly-increased commanded gear 312.

After the increased torque request 310, the transmission changes from executing the initial shift (Gear 4 to Gear 3) to executing the adjusted shift (from Gear 4 to Gear 2). The increased torque request 320 may again be referred to as a threshold increase, because that increase was sufficient to require the transmission 14 to be placed into the adjusted target gear (Gear 2), which has a higher speed ratio than the initial target gear (Gear 3). Without a lesser torque increase, the transmission 14 may be able to meet the torque needs of the powertrain 10 by simply increasing torque from the engine 12 while in Gear 3.

For the transmission 14, executing the adjusted shift is possible because the fourth torque-transmitting mechanism 38 is the common controlling clutch between the initial target gear (Gear 3) and the adjusted target gear (Gear 2). The common controlling clutch and the threshold increase in the torque request 310 are transition conditions which must be satisfied for the transmission 14 to execute the adjusted shift after beginning the initial shift.

The fourth torque-transmitting mechanism 38 was both the off-going clutch for the initial downshift from Gear 4 to Gear 3, and the off-going clutch for the downshift from Gear 4 to Gear 2. Note, however, that the fourth torque-transmitting mechanism 38 would not be the off-going clutch for a downshift from Gear 3 to Gear 2.

Alternatively, the transmission 14 could have finished the initial shift and then executed a second shift from Gear 3 to Gear 2, but that would require time to finish the initial shift and may require time to reset or synchronize the transmission 14 before executing the next shift. The initial shift could also have been aborted by the moving transmission 14 into a neutral mode, but neutral modes interrupt delivery of output torque and would decrease output acceleration. Executing the adjusted shift shown in the chart 300 may significantly decrease the total time between the driver's increased torque request 310 and the ability of the transmission 14 to change to Gear 2 and supply the requested amount of torque.

After commanding the adjusted shift to the adjusted target gear, instead of completing engagement of the fourth torque-transmitting mechanism 38, the transmission 14 empties the third torque-transmitting mechanism 36, as shown by the first on-coming clutch pressure 322. The third torque-transmitting mechanism 36 is emptied because it is no longer needed and the pre-filled state is unnecessary.

The transmission then begins to stage a second on-coming clutch pressure 326, which is the second torque-transmitting mechanism 34 (CB26) and will be engaged to place the transmission 14 into Gear 2. As soon as the transmission 14 recognizes that the adjusted shift to Gear 2 is needed, it begins pre-filling and staging the second torque-transmitting mechanism 34, as shown by second on-coming clutch pressure 326. The adjusted shift finishes when the common controlling clutch—the fourth torque-transmitting mechanism 38—finally exhausts and releases control and the second torque-transmitting mechanism 34 completes its fill and engages.

The chart 300 also shows a common holding clutch pressure 328, which is engaged throughout the change-of-mind 4-3-2 shift maneuver. The common holding clutch pressure 328 is illustrative of the relative fluid pressure of the fifth torque-transmitting mechanism 40 (CB1234). Having a common holding clutch may also be one of the transition conditions necessary for the transmission 14 to execute the adjusted shift.

Therefore, the 4-3-2 shift maneuver completes with the transmission 14 in Gear 2 without passing through neutral and without completing the initial shift to Gear 3. As shown in the chart 300, the output acceleration 316 remains smooth throughout the 4-3-2 shift maneuver. Note that if the a sufficiently high torque request 310 occurred at the beginning of the shift, the transmission could have simply executed a power-on downshift directly from Gear 4 to Gear 2.

Figure 5:
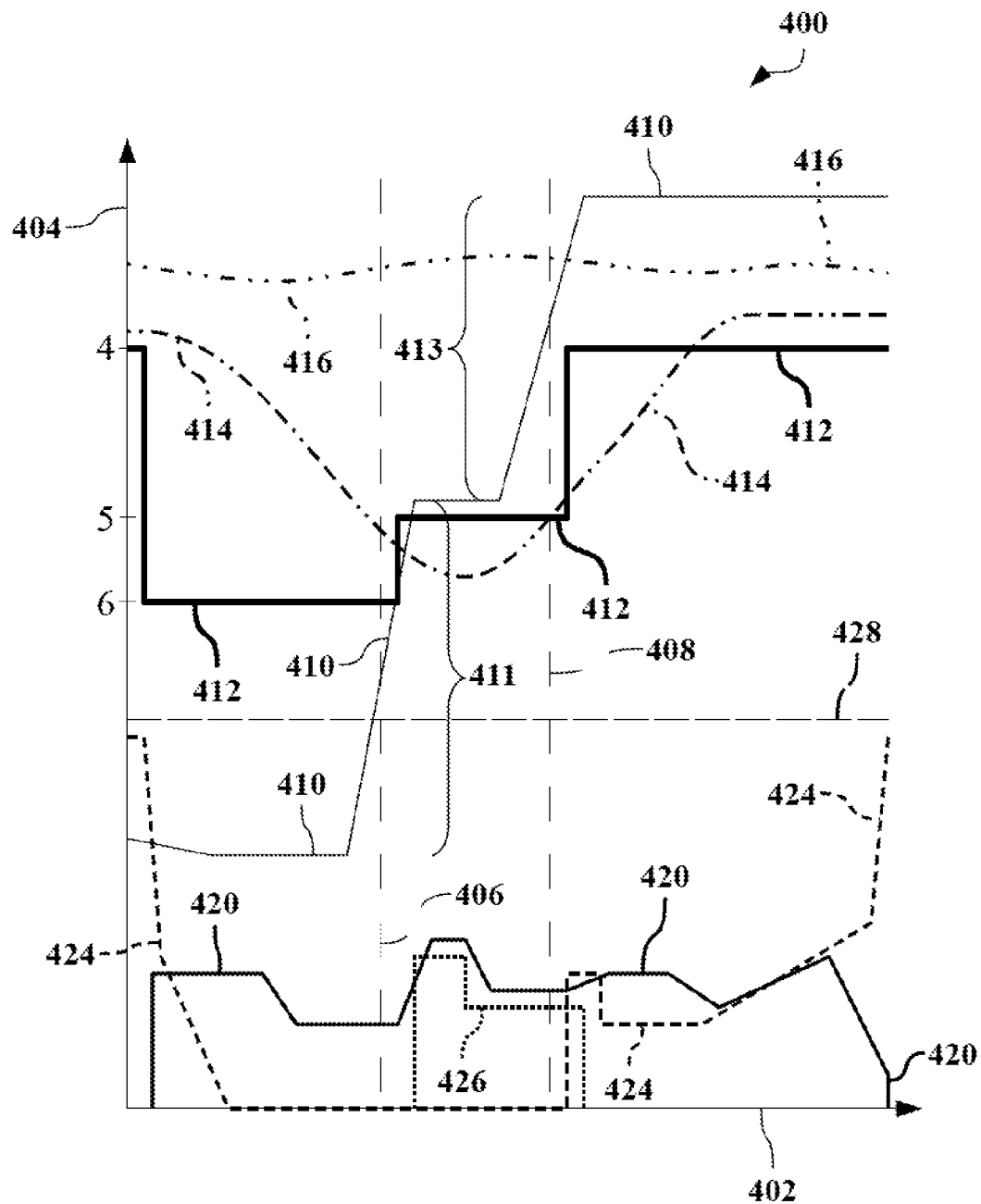
FIG. 5 is a schematic chart of another shift maneuver for automatic transmissions, such as those shown and described in FIG. 1.

Referring now to FIG. 5, and with continued reference to FIGS. 1-4, there is a schematic chart 400 of another illustrative shift maneuver for the transmission 14 or similar transmissions. FIG. 5 shows a 4-6-5-4 shift maneuver, in which elements shown in FIGS. 2 and 3 are combined with those shown in FIG. 4. FIG. 5 first shows the transmission 14 seamlessly changing from an upshift to a power-on downshift, and then from that power-on shift to another power-on downshift.

The chart 400 shows the transmission moving seamlessly from an initial shift between Gear 4 to Gear 6, to an adjusted shift taking the transmission 14 to Gear 5, and then through a chained shift to an ultimate gear, Gear 4. This 4-6-5-4 shift maneuver occurs as a result of two separate threshold increases as the driver (of the control system) changes the target gear twice.

The chart 400 includes an x-axis 402, which illustrates time from left to right, and a y-axis 404, which represents different values depending upon the individual characteristics being shown. A first time marker 406 and a second time marker 408 are used to help identify general locations of events occurring during the shift maneuver.

A torque request 410 illustrates the relative amount of torque being requested of the transmission 14. Again the torque request 410 may be derived from many inputs or control systems. The torque request 410 also shows a first threshold increase 411 occurring around the first time marker 406 and a second threshold increase 413 occurring around the second time marker 408. Note that if the first threshold increase 411 had been large enough to require Gear 4, the transmission 14 could have simply executed the 4-6-4 shift maneuver shown in FIG. 3.

A commanded gear 412 shows the gear sought by the transmission 14, which may be determined by the transmission 14 or the control system from analysis of the operating conditions of the powertrain 10 in light of the torque request 410. The commanded gear 412 may be illustrative of additional processes, such as a requested gear from the driver. The commanded gear 412 is plotted in speed ratio terms, and Gear 4 is shown higher than Gear 6 because Gear 4 has higher speed ratio.

As shown in chart 400, the commanded gear 412 for the 4-6-5-4 shift maneuver shows the planned shift from Gear 4 to Gear 6 at the beginning of the initial shift and then changes to execute the adjusted shift to Gear 5 after the first threshold increase 411. Then, after the second threshold increase 413, the commanded gear 412 moves to further downshift the transmission 14 to Gear 4. Each of the changes in the commanded gear 412 occurs before completion of the previous shift, so the transmission 14 cannot immediately execute a conventional shift to meet the new commanded gear 412.

The chart 400 includes an input speed 414, which illustrates the relative rotational speed (Ni) of the input member 18 for the transmission 14. The chart 400 further illustrates an output acceleration 416 of the transmission 14 to the final drive 16 during the 4-6-5-4 shift maneuver.

The relative pressures of the clutches used to place the transmission 14 into all of the respective speed ratios are also shown in the chart 400. A controlling clutch pressure 420 shows the element that controls the initial shift, the adjusted shift, and the chained shift. For the 4-6-5-4 shift maneuver, the controlling clutch is the second torque-transmitting mechanism 34 (CB26). The controlling clutch pressure 420 controls the effective speed ratio of the transmission during the shift maneuver.

The chart 400 shows a first off-going clutch pressure 424. In the 4-6-5-4 shift maneuver, the first off-going clutch pressure 424 shows the fluid pressure of the fifth torque-transmitting mechanism 40 (C1234). As shown toward the end of the chart 400, the fifth torque-transmitting mechanism 40 is both the first off-going clutch pressure 424 and the second (or final) on-coming clutch which will be engaged to finish the maneuver and place the transmission 14 into Gear 4.

The first off-going clutch pressure 424 is exhausted at the beginning of the initial shift as the controlling clutch pressure 420 increases and takes control of the initial shift. If the transmission 14 were to finish the initial shift, the controlling clutch pressure 420 would be further increased to engage the second torque-transmitting mechanism 34 and place the transmission into Gear 6.

After time marker 406, the transmission 14 determines that the increased torque request 410 is better satisfied by downshifting the transmission 14 to Gear 5 instead of the planned Gear 6, as shown by the upward increase in the commanded gear 412. This represents a first change of mind from the torque request 410, as it appears that the driver has changed from a significantly decreasing torque request to an increasing torque request. Because the initial shift from Gear 4 to Gear 6 has not yet completed, the transmission 14 cannot simply execute a second, consecutive shift from Gear 6 to Gear 5 to satisfy the increased (in speed ratio terms) commanded gear 412.

After the increase in torque request 410, the transmission changes from executing the initial shift (Gear 4 to Gear 6) to executing the adjusted shift (to Gear 5). The first threshold increase 411 was sufficient to require the transmission 14 to be placed into a gear having a higher speed ratio than the initial target gear. Without the first threshold increase 411, or with a lesser increase, the transmission 14 may have been able to meet the torque needs of the powertrain 10 while in Gear 6.

For the transmission 14, the change to the adjusted shift is possible because the second torque-transmitting mechanism 34 is the common controlling clutch between the initial target gear (Gear 6) and the adjusted target gear (Gear 5). The second torque-transmitting mechanism 34 was the on-coming clutch for the upshift from Gear 4 to Gear 6, and is also the off-going clutch for executing the downshift from Gear 6 to Gear 5 (although it should again be noted that the transmission 14 is never actually placed into Gear 6 during the maneuver).

Alternatively, the transmission 14 could have finished the initial shift and then executed a second shift from Gear 6 to Gear 4, but that would require time to finish the initial shift and may require time to reset or synchronize the transmission 14. The initial shift could also have been aborted by opening all of the clutches and moving into a neutral mode, but neutral modes stop delivery of output torque and would decrease output acceleration.

After commanding the adjusted shift to the adjusted target gear, the transmission 14 begins to fill the on-coming clutch for Gear 5, which is the third torque-transmitting mechanism 36, as shown in the chart 400 as a second on-coming clutch pressure 426. The adjusted shift would have finished when the common controlling clutch pressure 420 emptied the second torque-transmitting mechanism 34 and the second on-coming clutch pressure 426 completed filling of the fifth torque-transmitting mechanism 40.

However, before the transmission 14 completes the adjusted shift, the second threshold increase 413 occurs. Due to the magnitude of the increase in the torque request 410, the commanded gear 412 changes again to now request Gear 4. This second change of mind initiates the need for the chained shift.

The transmission 14 then exhausts the second on-coming clutch pressure 426 to empty the (no longer needed) fifth torque-transmitting mechanism 40. The transmission 14 also begins staging the final on-coming clutch for Gear 4, which is the fourth torque-transmitting mechanism 38. The fluid pressure for the fourth torque-transmitting mechanism 38 is already shown on the chart 400 as the first off-going clutch pressure 424.

The chained shift is possible because the chaining conditions are satisfied, including the magnitude of the second threshold increase 413 being sufficient to request a lower gear and the second torque-transmitting mechanism 34 being the common controlling clutch for placing the transmission 14 into the chained target gear. The chained shift is finished by completed handoff from the common controlling clutch pressure 420 to the first off-going clutch pressure 424. Once the second torque-transmitting mechanism 34 is emptied and the fourth torque-transmitting mechanism 38 is filled, the transmission 14 is in the chained target gear and the 4-6-5-4 shift maneuver is completed.

The chart 400 also shows a common holding clutch pressure 428, which is engaged throughout the change-of-mind 4-6-5-4 shift maneuver. The common holding clutch pressure 428 is illustrative of the relative fluid pressure of the fourth torque-transmitting mechanism 38 (C456). Having a common holding clutch may also be one of the transition conditions necessary for the transmission 14 to execute the adjusted shift and one of the chaining conditions necessary for the transmission 14 to execute the chained shift.

The 4-6-5-4 shift maneuver, or other shift maneuvers described herein, may further be chained or combined with other shift control schemes. For example, and without limitation, the maneuvers shown and described herein may be combined with skip-at-sync or quick skip-at-sync shift control strategies. The skip-at-sync may prepare the transmission 14 for a downshift to a further chained gear—to Gear 3, for example—by preparing the clutches for the further chained gear before completing the chained shift to Gear 4.

Executing the adjusted shift and the chained shift may significantly decrease the total time between the driver's increased torque request 410 and the ability of the transmission 14 to change to Gear 4 and supply the requested amount of torque. Executing the adjusted shift does not include completing the initial shift, such that the transmission 14 is not placed into the initial target gear (Gear 6). Furthermore, the chained shift does not include completing the adjusted shift, such that the transmission 14 is not placed into the adjusted target gear (Gear 5).

Figure 6:
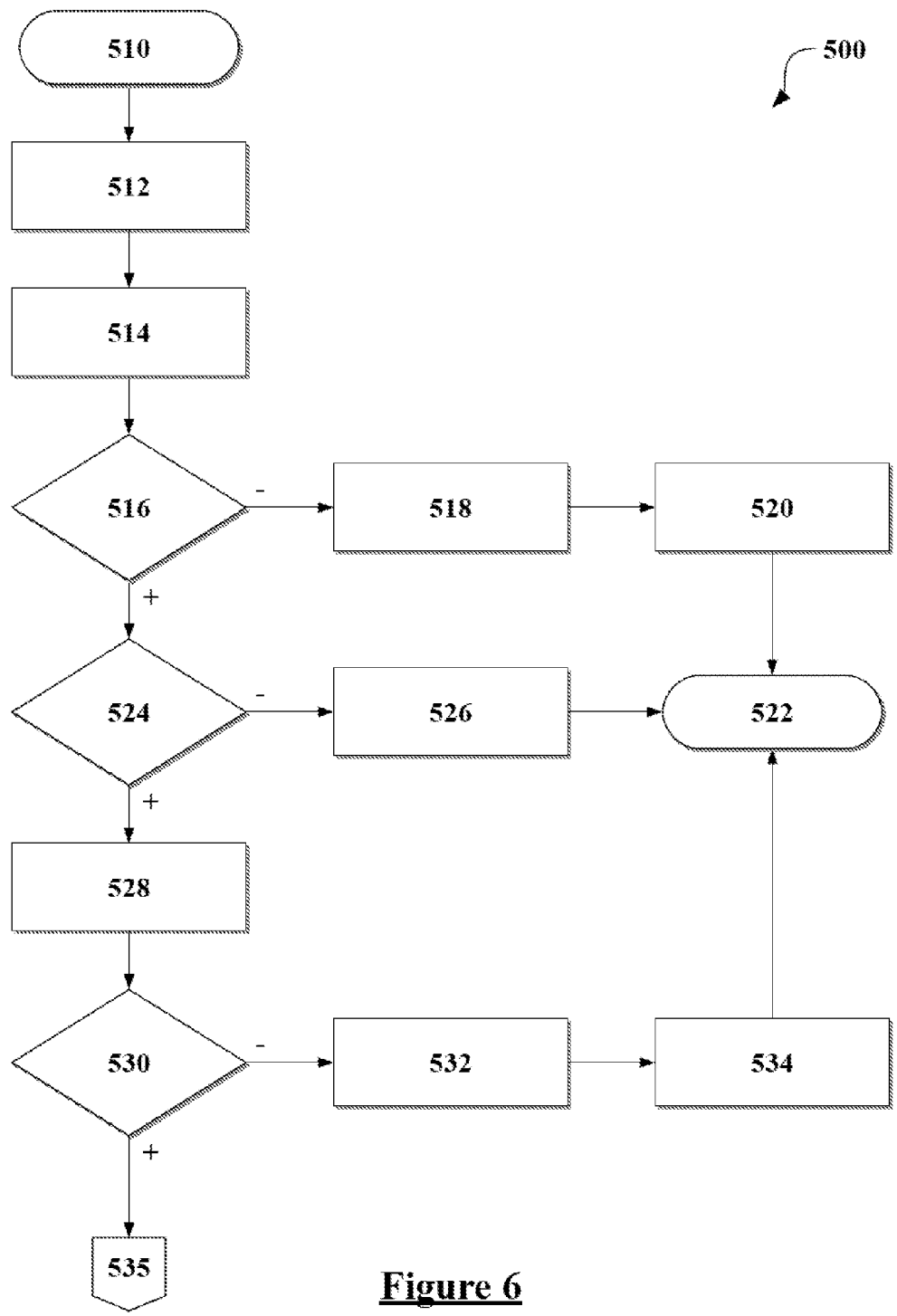
FIG. 6 is a schematic flow chart diagram of an algorithm or method for controlling shifts in multi-speed transmissions, such as those shown and described in FIG. 1.
Figure 7:
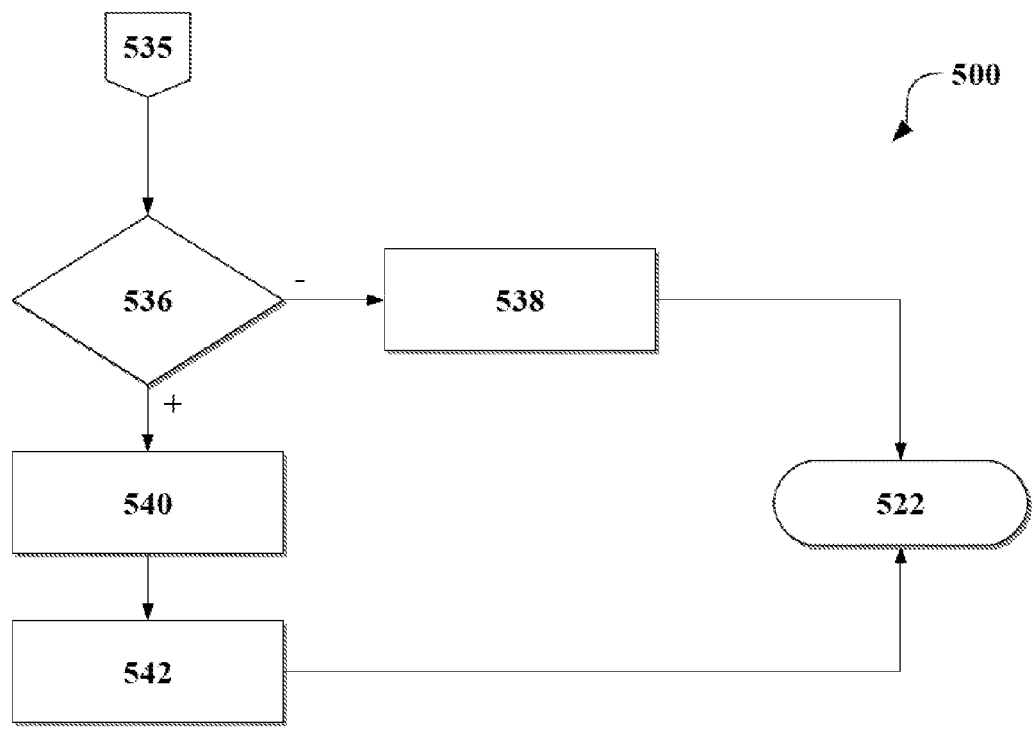
FIG. 7 is a continuation of the flow chart diagram of FIG. 6.

Referring now to FIGS. 6 and 7 there is shown a schematic flow chart diagram of an algorithm or method 500 for controlling a transmission, such as the transmission 14 shown in FIG. 1. FIGS. 6 and 7 show only a high-level diagram of the method 500, which continues from FIG. 6 to FIG. 7. The exact order of the steps of the algorithm or method 500 shown in FIG. 4 is not required. Steps may be reordered, steps may be omitted, and additional steps may be included. Furthermore, the method 500 may be a portion or sub-routine of another algorithm or method.

For illustrative purposes, the method 500 may be described with reference to the elements and components shown and described in relation to the other figures and may be executed by the transmission 14 or a control system associated therewith. However, other components may be used to practice the method 500 and the invention defined in the appended claims. Note, for example, that the method 500 may also be applied to control a dual-clutch transmission. Any of the steps may be executed by multiple controls or control system components.

Step 510: Start.

The method 500 may begin at a start or initialization step, during which time the method 500 is made active and may be operating conditions of the vehicle, the powertrain 10, and the transmission 14. Initiation may occur, for example, in response to the vehicle operator inserting the ignition key or in response to specific conditions being met, such as whenever the control system requests a shift for the transmission 14. The method 500 may be running constantly or looping constantly whenever the vehicle is in use.

Step 512: Monitor Torque Request.

The method 500 monitors the torque needs or requests of the transmission 14. Additionally, the method 500 monitors current speed ratio and clutch status of the transmission 14. Alternatively, the method 500 may be monitoring for, or receiving, shift requests or gear requests to place the transmission 14 into specific gears.

Step 514: Begin Initial Shift.

The method 500 includes beginning an initial shift. The initial shift changes the transmission 14 from a starting gear to an initial target gear. Depending upon the torque request, the initial target gear may have a higher or a lower speed ratio that the starting gear.

Step 516: Threshold Increase in Torque Request?

The method 500 determines whether or not transition conditions are satisfied, which would allow execution of an adjusted shift. One of the transition conditions is the occurrence of a threshold increase in the torque request. The adjusted shift would take the transmission 14 to an adjusted target gear instead of the initial target gear.

The threshold increase is any increase that is sufficient to require the transmission 14 to be placed into an adjusted target gear. The threshold increase may be measured between a first torque request during the beginning of the initial shift and a second torque request occurring after beginning the initial shift.

Step 518: Finish Initial Shift.

If there is no threshold increase in the torque request, the transition conditions are not met. Because no change to the shift maneuver is needed, the method 500 then finishes the initial shift.

Step 520: Achieve Initial Target Gear.

The method 500 places the transmission 14 into the initial target gear. Depending upon the torque request, the transmission 14 may then be changed to other gears.

Step 522: End.

Ending the method 500 may include deactivating the method 500 until called upon for another shift. Alternatively, the method 500 may be looping or running continuously until the transition conditions are met. The method 500 may be part of a larger transmission control system and may be a sub-process of other shift-control algorithms.

Step 524: Common Controlling Clutch?

In addition to the threshold increase in torque request, the method 500 also determines whether there is a common controlling clutch between the initial shift and the adjusted shift. The common controlling clutch is an off-going clutch to place the transmission 14 into the adjusted target gear. When the initial shift is an upshift, the common controlling clutch is also the on-coming clutch to place the transmission 14 into the initial target gear. When the initial shift is a downshift, the common controlling clutch is also the off-going clutch to place the transmission 14 into the initial target gear.

Step 526: Finish or Abort Initial Shift.

If there is no common controlling clutch between the initial shift and the adjusted shift, the adjusted shift cannot be executed by the remainder of the method 500. Therefore, the transmission 14 will need to reach the adjusted target gear via different processes.

For example, the method 500 may finish executing the initial shift, and then execute one or more additional shifts to place the transmission 14 into the adjusted target gear. Alternatively, the initial shift may be aborted through neutral, allowing the transmission 14 to then shift to the adjusted target gear or another gear. Other techniques may be used to further alter the speed ratio of the transmission 14, and other processes or algorithms may take over for the method 500 once it determines that the transition conditions have not been satisfied.

Step 528: Execute Adjusted Shift.

If the transition conditions are satisfied, and no intervening torque request changes the shift maneuver, the method 500 may execute the adjusted shift. The method 500 then uses the common controlling clutch to change the transmission 14 to the adjusted target gear.

Step 530: Threshold Increase in Torque Request?

The method 500 also continues monitoring for another threshold increase in the torque request before the adjusted shift is completed. If another threshold increase occurs, and other conditions are met, the transmission 14 may instead execute a chained shift.

The added threshold increase may be measured from the second torque request to a third torque request after beginning the adjusted shift. The added threshold increase is sufficient to require the transmission to be placed into a chained target gear.

Step 532: Finish Adjusted Shift.

If no threshold increase in the torque request occurs, the method 500 will finish executing the adjusted shift. To finish the adjusted shift, the method 500 uses the common controlling clutch to change the transmission 14 to the adjusted target gear.

Depending upon the configuration of the transmission 14, the initial shift and the adjusted shift may also share a common holding clutch. The common holding clutch is engaged during both the initial shift and the adjusted shift.

Step 534: Achieve Adjusted Target Gear.

The transmission 14 exhausts the common controlling clutch and engages the on-coming clutch for the adjusted target gear. Therefore, the transmission 14 achieves a higher speed ratio than it would have with the initial target gear, and the transmission 14 is not placed into the initial target gear as an intermediary gear.

Step 535: Diagram Continued.

Connector 535 links the method 500 between the portions of the schematic flow chart diagram shown on FIG. 6 and FIG. 7.

Step 536: Common Controlling Clutch?

If threshold increase in the torque request occurs, the method 500 will determine whether the chained shift also shares a common controlling clutch with the adjusted shift (and the initial shift). If present, the common controlling clutch would also be an off-going clutch to place the transmission 14 in the chained target gear. Note that FIGS. 6 and 7 both contain portions of the method 500.

Step 538: Finish or Abort Adjusted Shift.

If there is no common controlling clutch between the adjusted shift and the chained shift, the chained shift cannot be executed by the method 500. Therefore, the transmission 14 will need to reach the chained target gear via different processes.

Step 540: Execute Chained Shift.

If the chaining conditions are satisfied, the method 500 may execute the chained shift to move the transmission to the chained target gear. To finish the chained shift, the method 500 uses the common controlling clutch to change the transmission 14 to the chained target gear.

Step 542: Achieve Chained Target Gear.

The transmission 14 exhausts the common controlling clutch and engages the on-coming clutch for the chained target gear. Note that the on-coming clutch for the chained target gear (or for the adjusted target gear) may have been an off-going clutch earlier in the shift maneuver. Therefore, the transmission 14 achieves a higher speed ratio than it would have with the initial target gear or the adjusted target gear. Depending upon the configuration of the transmission 14, the chained shift may also share the common holding clutch.

The transmission 14 is not placed into the initial target gear or the adjusted target gear as an intermediary gear. Furthermore the transmission 14 is not placed into neutral during the shift maneuver.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling shifts in a multi-speed transmission, comprising:
   beginning an initial shift, wherein the initial shift changes the transmission from a starting gear to an initial target gear;
   executing an adjusted shift when transition conditions are satisfied, wherein the adjusted shift changes the transmission to an adjusted target gear which has a higher speed ratio than the initial target gear, and wherein the transition conditions include:
      a threshold increase from a first torque request during the beginning of the initial shift to a second torque request after beginning the initial shift, wherein the threshold increase is sufficient to require the transmission to be placed into the adjusted target gear, and
      a common controlling clutch, wherein the common controlling clutch is an on-coming clutch to place the transmission in the initial target gear and also an off-going clutch to place the transmission in the adjusted target gear;
   wherein executing the adjusted shift does not include placing the transmission in a neutral mode; and
   wherein executing the adjusted shift does not include completing the initial shift, such that the transmission is not placed into the initial target gear.

2. The method of claim 1, wherein the transition conditions further include:
   a common holding clutch, wherein the common holding clutch is engaged during both the initial shift and the adjusted shift.

3. The method of claim 2, further comprising:
   executing a chained shift when chaining conditions are satisfied, wherein the chained shift changes the transmission to a chained target gear which has a higher speed ratio than the adjusted target gear, and wherein the chaining conditions include:
      an added threshold increase from the second torque request to a third torque request after beginning the adjusted shift, wherein the added threshold increase is sufficient to require the transmission to be placed into the chained target gear, and
      wherein the common controlling clutch is also an off-going clutch to place the transmission in the chained target gear; and
   wherein executing the chained shift does not include completing the adjusted shift, such that the transmission is not placed into the adjusted target gear.

4. The method of claim 3, further comprising:
   staging a second on-coming clutch for the adjusted target gear after beginning executing the adjusted shift, wherein staging includes pre-filling the first on-coming clutch for the adjusted target gear;
   exhausting the first on-coming clutch for the adjusted target gear after beginning executing the chained shift; and
   staging a final on-coming clutch for the chained target gear after beginning executing the chained shift, wherein staging includes pre-filling the final on-coming clutch for the chained target gear.

5. The method of claim 4, wherein the common holding clutch is also engaged during the chained shift.

6. The method of claim 5, wherein the initial shift is an upshift, such that the starting gear has a lower speed ratio than the initial target gear.

7. A method of controlling shifts in a multi-speed transmission, comprising:
   beginning an initial shift, wherein the initial shift changes the transmission from a starting gear to an initial target gear;
   executing an adjusted shift when transition conditions are satisfied, wherein the adjusted shift changes the transmission to an adjusted target gear which has a higher speed ratio than the initial target gear, and wherein the transition conditions include:
      a threshold increase after beginning the initial shift, wherein the threshold increase is sufficient to require the transmission to be placed into the adjusted target gear, and
      a common controlling clutch, wherein the common controlling clutch is an off-going clutch to place the transmission in the adjusted target gear;
   wherein executing the adjusted shift does not include placing the transmission in a neutral mode; and
   wherein executing the adjusted shift does not include completing the initial shift executing a chained shift when chaining conditions are satisfied, wherein the chained shift changes the transmission to a chained target gear having a higher speed ratio than the adjusted target gear, and wherein the chaining conditions include:
   an added threshold increase, wherein the added threshold increase is sufficient to require the transmission to be placed into the chained target gear, and
   wherein the common controlling clutch is also an off-going clutch to place the transmission in the chained target gear; and wherein executing the chained shift does not include completing the adjusted shift.

8. The method of claim 7,
   wherein the transition conditions further include a common holding clutch, which is engaged during both the initial shift and the adjusted shift, and
   wherein the chaining conditions further include the common holding clutch, which is engaged during chained shift.

* * * * *